Jan. 17, 1956    R. A. EDENS    2,731,273
TOOL HOLDERS
Filed May 23, 1955
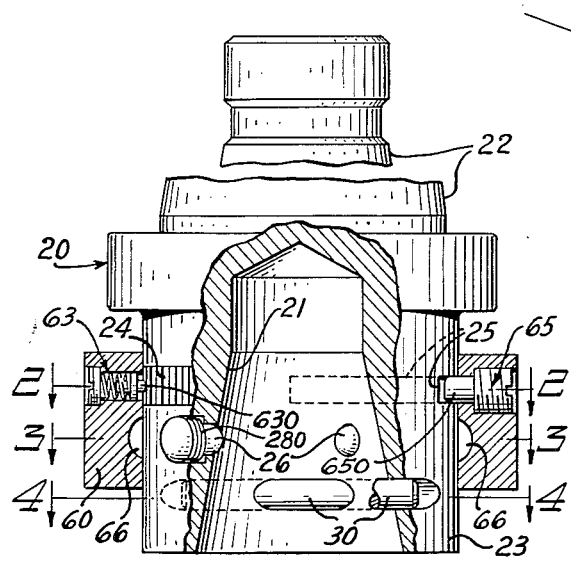
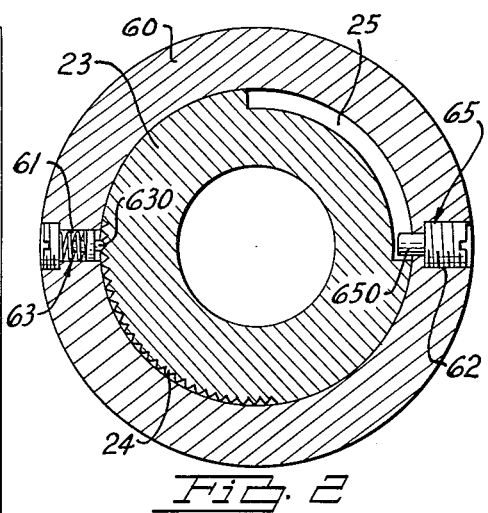
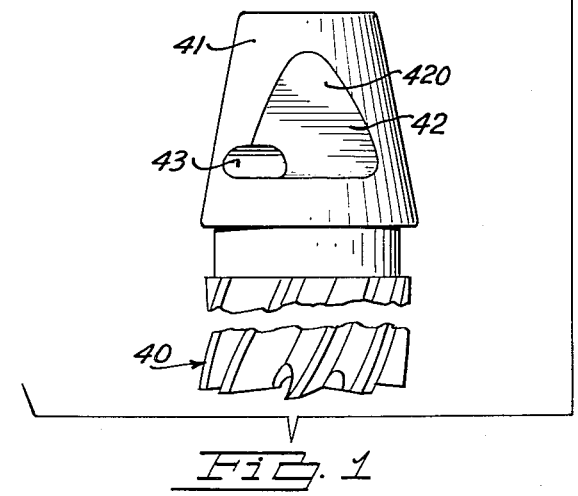
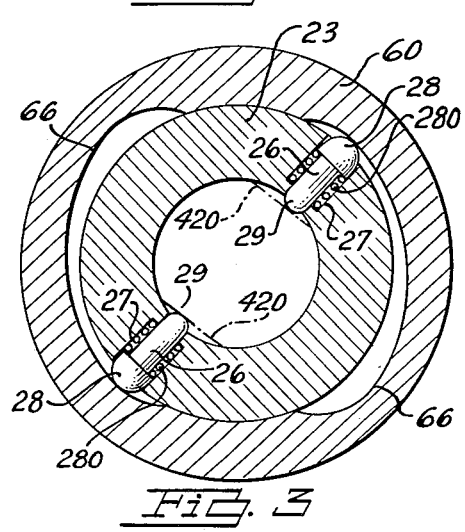
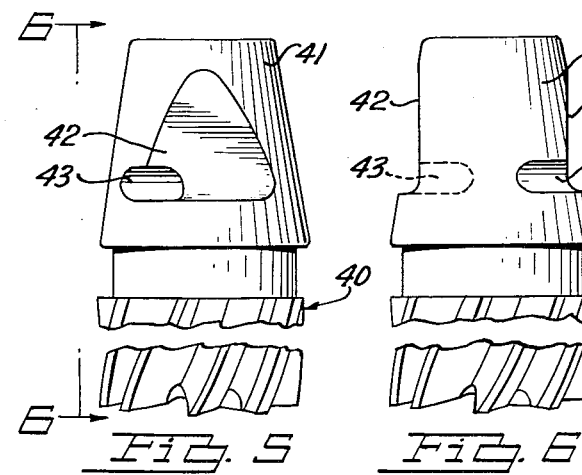
INVENTOR.
RALPH A. EDENS
BY
ATTORNEY United States Patent Office 2,731,273
Patented Jan. 17, 1956

2,731,273

TOOL HOLDERS

Ralph A. Edens, Grosse Pointe Woods, Mich., assignor to Falcon Tool Company, a corporation of Michigan Application May 23, 1955, Serial No. 510,466

3 Claims. (Cl. 279—81)

This invention relates to tool holders, and in particular to improvements in tool holders for tapered shanked cutters, reamers, drills, and the like.

This invention is an improvement over the tool holder disclosed and claimed in Patent No. 2,540,937 issued to Ralph A. Edens on February 6, 1951, which tool holder, although effective in holding tapered shanked tools accurately in quick locking non-binding relationship therewithin, only holds the tool firmly when rotated in a single drive direction, and therefore, the said tool holder is not usable for tap driving and other operations wherein the direction of rotation of the tool must be reversed.

With the foregoing in view, the primary object of the instant invention is to provide a quick locking non-binding tool holder for tapered shanked tools that effectively locks a tapered shanked tool in the tool holder and positively holds the said tool therein when driven in the normal or main drive direction as well as when the direction of drive is reversed to remove the tool from the work.

A further object of the invention is to provide an improved quick locking non-binding tool holder that holds tapered shanked tools therein in such solid non-fluttering manner that the tool holder and tool function equivalent to a one piece structure under the most severe operating conditions.

Other objects of the invention will become apparent by reference to the following detailed description taken in connection with the accompanying drawing, in which:

Fig. 1 is a vertical elevational view of a tool holder and tapered shanked tool embodying the invention with portions broken away to better illustrate the construction.

Fig. 2 is a horizontal sectional view taken on the line 2—2 of Fig. 1 showing the ratchet and cam ring retainer mechanism.

Fig. 3 is a horizontal sectional view taken on the line 3—3 of Fig. 1 showing the cam groove and reverse lock pin construction.

Fig. 4 is a horizontal sectional view taken on the line 4—4 of Fig. 1 showing the main drive lock pin construction.

Fig. 5 is an elevational view of a tapered shank tool of a type usable with a tool holder embodying the invention.

Fig. 6 is an elevational view of the tapered shank tool taken on the line 6—6 of Fig. 5.

Referring now to the drawing wherein like numerals refer to like and corresponding parts throughout the several views, the illustrative embodiment of the invention disclosed therein comprises the combination of a tool holder 20 having a female taper 21 formed axially in the lower end thereof to accommodate a tool 40 having a male tapered shank 41 formed complementary to the female taper 21 of the said tool holder, and a locking pin and cam lock mechanism hereinafter described for firmly and releasably locking the said tool 40 in the tool holder 41 for rotation thereby in main drive and reverse drive directions.

The said tool holder 20 has a male tapered shank 22 or other formation at its upper end to permit it to be chucked into the head of a machine tool for rotation in either direction. The lower portion 23 of the said tool holder 20 is preferably cylindrical to accommodate a cam lock ring 60 thereover. The said cylindrical portion 23 of the tool holder 20 is provided with diametrically oppositely disposed bores 61 and 62. In the bore 61 of the tool holder 20 is an inwardly projecting ratchet mechanism 63 including a spring loaded ratchet pin 630 which engages ratchet teeth 24 formed along approximately a 90 degree quadrant of the periphery of the lower cylindrical portion 23 of the tool holder 20. The said ratchet mechanism maintains the cam lock ring 60 into any position to which it may be turned. In the bore 62 of the tool holder 20 is threaded a cam lock ring retainer element 65 including a retainer pin 650 which extends into a cam lock ring retainer groove 25 formed along approximately a 90 degree quadrant of the outer periphery of the said lower cylindrical portion 23 of the said tool holder 20. The foregoing construction places the ratchet teeth 24 and the cam ring retainer groove 25 formed in the outer periphery of the cylindrical portion 23 of the tool holder 20 diametrically opposite each other, and places the ratchet pin 630 and the retainer pin 650 carried by the cam lock ring 60 diametrically opposite each other. The angular relationship between the ratchet pin 630 and the ratchet teeth 24, and the angular relationship between the retainer pin 630 and the retainer groove 25 is such that the cam lock ring 60 may be turned approximately 90 degrees from a fully unlocked position (not shown) to the fully locked position shown in Fig. 2.

Spaced below the said ratchet mechanism 63 and the cam lock ring retainer element 65 is a pair of diametrically disposed reciprocating locking pins 26 positioned through suitably shouldered oppositely disposed apertures 27 in the cylindrical portion 23 of the tool holder 20. Each of the said reciprocating locking pins 26 have a semi-spherical cam head 28 and a semi-spherical locking head 29 at opposite ends thereof, the said cam heads 28 being spring urged by compression springs 280 radially outwardly against diametrically opposite locking cams 66 formed within the cam lock ring 60 as best shown in Figs. 1 and 3, the said reciprocating locking pins 26 being shown locked in their locked or driving position in Fig. 3.

The said cylindrical portion 23 of the tool holder 20 is also provided with a pair of parallel locking pins 30 disposed therethrough in a manner to project partially into the female taper 21 of the said tool holder 20 at opposite sides thereof. As indicated by reference to Figs. 3 and 4, the reciprocating locking pins 26 are preferably diametrically disposed opposite each other at approximately 45 degrees in respect to the oppositely positioned parallel locking pins 30, and, by reference to Fig. 2, it will be observed that the ratchet teeth 24 and the cam ring retainer groove 25 are located in a plane spaced above the plane of the oppositely disposed reciprocating locking pins 26. Obviously, the relative angular orientation and location of the several elements of the tool holder 20 and the several elements of the locking cam ring 60 may be varied as desired provided the proper functioning of the several elements of the tool holder 20 in respect to each other and the tool 40 is maintained.

The tapered shank 41 of the tool 40 is flattened on opposite sides as indicated by the numeral 42, which flattened sides are preferably parallel to the longitudinal axis of the said tool 40. Cams 43 are formed in the tapered shank 41 of the tool 40 at the base of the said flat surfaces 42 therein extending, as viewed from the top of the said tool 40, clockwise circumferentially from the said flat surfaces 42 partially around the said tapered shank 41. The cams 43 of the tapered shanked tool 40 engage the parallel locking pins 30 of the tool holder 20 and firmly hold the said tapered shanked tool 40 in the female taper 21 of the said tool holder 20 after the said tool 40 is positioned in the tool holder 20 and is turned clockwise as viewed from the bottom of tool 40 toward the tool holder 20. In this positon, a counterclockwise rotation of the tool holder 20 as viewed from the bottom thereof drives the said cutting tool 40 counterclockwise with the cams 43 of the said tool 40 in engagement with the said locking pins 30 of the tool holder 20.

When the said tool 40 is thus positioned in the tool holder 20, the upper portions 420 of the flat surfaces 42 of the tool 40 are located angularly opposite the longitudinal axis of the semi-spherical locking heads 29 of the reciprocating locking pins 26 as indicated by the dot and dash lines 420 in Fig. 3. The cam lock ring 60 is then turned clockwise approximately 90 degrees as viewed in Fig. 3 from its unlocked position (not shown) to its fully locked position shown in Fig. 3 wherein the oppositely disposed cams 66 formed therein engage the cam heads 28 of the locking pins 26 and cause the locking heads 29 thereof to engage the flat portions 420 of the flat surfaces 42 formed on the tapered shank 41 of the tool 40.

When the cam lock ring 60 is so positioned the ratchet mechanism generally designated by the numeral 63 prevents accidental loosening or backing-off of the cam lock ring 60, and the tool 40 is driven by the tool holder 20 through the mating male and female tapers 41 and 21 thereof respectively with the tool 40 locked by the parallel locking pins 30 against slippage in respect to the tool holder 20 when driven in the main drive direction and with the tool 40 locked by the locking pins 26 against slippage with respect to the tool holder 20 when driven in the reverse drive direction.

Although but one embodiment of the invention has been disclosed and described in detail, it is obvious that many changes may be made in the size, shape, arrangement and detail of the various elements of the invention as defined by the appended claims.

I claim:

1. In combination, a tool holder having an axially disposed female taper therein, a pair of oppositely disposed reciprocating locking pins each having a cam head extending radially outwardly from said tool holder and a locking head extendable axially into said tapered bore, spring means constantly urging said locking pins radially outward, a cam lock ring having diametrically opposite locking cams formed therein, one of said locking cams being disposed over the cam head of each locking pin, a pair of fixed oppositely disposed locking pins extending through said tool holder presenting a portion thereof within said female taper in a plane below the plane occupied by said reciprocating locking pins, a tool including a male tapered shank formed complementary to the female taper in said tool holder with axially flat portions on opposite sides thereof and having a pair of locking cams formed at the base of said flat portions and extending partially around said tapered shank therefrom, the locking cams of said tool shank engaging the fixed locking pins of said tool holder to lock the tool in said tool holder when the tool shank is inserted into the tool holder taper and turned a partial turn in respect to said tool holder, the said reciprocating locking pins engaging the flat portions of said taper responsive to the turning of the said cam lock ring after the said tool has been positioned in said tool holder and turned to engage said locking cams with said locking pins, and means releasably maintaining said cam lock ring in the position to which it is turned.

2. In combination, a tool holder having an axially disposed female taper therein including a pair of oppositely disposed reciprocating locking pins each having a cam head extending radially outwardly from said tool holder and a locking head extendable axially into said tapered bore, spring means constantly urging said locking pins radially outward, a cam lock ring having diametrically opposite locking cams formed therein, one of said locking cams being disposed over the cam head of each locking pin, a pair of fixed oppositely disposed locking pins extending through said tool holder presenting a portion thereof within said female taper in a plane below the plane occupied by said reciprocating locking pins, a tool including a male tapered shank formed complementary to the female taper in said tool holder with axially flat portions on opposite sides thereof and having a pair of locking cams formed at the base of said flat portions and extending partially around said tapered shank therefrom, the locking cams of said tool shank engaging the fixed locking pins of said tool holder to lock the tool in said tool holder when the tool shank is inserted into the tool holder taper and turned a partial turn in respect to said tool holder, the said reciprocating locking pins engaging the flat portions of said taper responsive to the turning of the said cam lock ring after the said tool has been so positioned in said tool holder, ratchet teeth formed on said tool holder, and a spring loaded ratchet pin carried by said cam lock ring engaging said ratchet teeth preventing accidental release of the said reciprocating locking pins during use of said tool.

3. In combination, a tool holder having an axially disposed female taper therein including a pair of oppositely disposed reciprocating locking pins each having a cam head extending radially outwardly from said tool holder and a locking head extendable axially into said tapered bore, spring means constantly urging said locking pins radially outward, a cam lock ring having diametrically opposite locking cams formed therein, one of said locking cams being disposed over the cam head of each locking pin, a pair of fixed oppositely disposed locking pins extending through said tool holder presenting a portion thereof within said female taper in a plane below the plane occupied by said reciprocating locking pins, a tool including a male tapered shank formed complementary to the female taper in said tool holder with axially flat portions on opposite sides thereof and having a pair of locking cams formed at the base of said flat portions and extending partially around said tapered shank therefrom, the locking cams of said tool shank engaging the fixed locking pins of said tool holder to lock the tool in said tool holder against torsional movement in a drive direction when the tool shank is inserted into the tool holder taper and turned a partial turn in respect to said tool holder, the said reciprocating locking pins engaging the flat portions of said taper responsive to the turning of the said cam lock ring after the said tool has been so positioned in said tool holder whereby to lock the said tool against torsional movement in a reverse drive direction, and means releasably maintaining said cam lock ring in the position to which it is turned.

No references cited.